G. FULLER.
Calculator.

No. 219,246. Patented Sept. 2, 1879.

Witnesses:
T. C. Brecht
Wm Beale Hale

Inventor
George Fuller,
By James L. Norris
Attorney.

UNITED STATES PATENT OFFICE.

GEORGE FULLER, OF BELFAST, IRELAND.

IMPROVEMENT IN CALCULATORS.

Specification forming part of Letters Patent No. 219,246, dated September 2, 1879; application filed April 16, 1878; patented in England, March 16, 1878.

*To all whom it may concern:*

Be it known that I, GEORGE FULLER, of Belfast, in the county of Antrim, in the Kingdom of Great Britain and Ireland, have invented certain Improvements in Spiral Slide-Rules for Working Arithmetical Calculations, of which the following is a specification.

The object of the apparatus forming the subject of the present invention is to work arithmetical calculations in which multiplication, division, involution, and evolution are either required singly or in combination.

Figure 1:
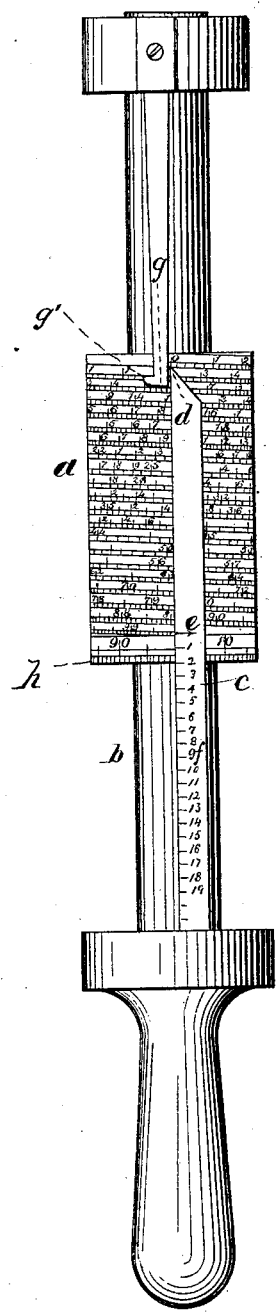
Figure 2:
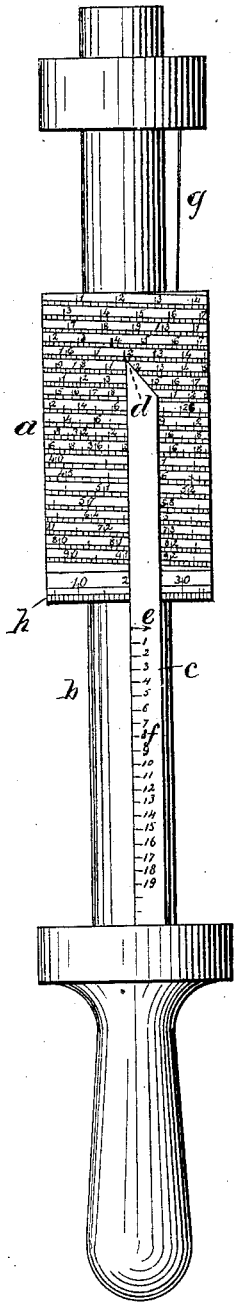

In the accompanying drawings, Figure 1 is a view in elevation of the apparatus. Fig. 2 shows the position of the parts at the termination of a process of multiplication, as hereinafter explained.

The apparatus consists of a cylinder, $a$, of wood, paper, or metal, on the curved surface of which a single logarithmic scale winds in a spiral. This scale may either be engraved upon the material used for the cylinder or printed upon card-board or paper and fixed round the cylinder. The cylinder is made hollow, so as to move up and down and turn round upon a cylindrical axis of wood, metal, or card-board, $b$, the friction between the axis and the cylinder to be such that while the cylinder can be easily moved by hand it will not move by its own weight, even when the axis is vertical.

Parallel to the axis, and fixed to the handle or stand that supports it, is a slip of metal or wood, $c$. This slip carries two indices, $d$ and $e$, and the scale $f$.

In addition to the above is a movable index, $g$, which is fixed to a ring, so that it can easily be moved along and round the axis into any required position, and the friction between it and the axis is sufficient to retain it in its place.

The spiral scale makes a whole number of turns round the cylinder, and the indices $d$ and $e$ are fixed so far apart that when one is at the commencement of the logarithmic scale the other is at its termination. The logarithmic scale is of the kind used for the ordinary slide-rule—that is, it is a scale upon which is plotted distances proportional to the decimal parts of a logarithm of numbers as given in the ordinary or Briggs' tables of logarithms, the numbers themselves being marked upon the scale against the distances representing their logarithms. The scale is placed in helical form simply to render available a great length within a small space, and said scale may be as long as desired, it only being necessary that when the scale is fixed to the cylinder the commencement and end of it must be in a line on the cylinder parallel to its axis and the spirals equidistant apart. The diameter of the cylinder is unimportant.

The scale $f$ is equal in length to the axial length of the spiral, and is divided into the same number of parts as there are turns in it, the index $e$ being the termination of the scale. At the bottom of the cylinder is a scale, $h$, which is merely the circular section of the cylinder divided into one hundred parts, the zero of the scale being the termination of the spiral.

In the employment of the apparatus the following is the *modus operandi:*

*Multiplication.*—Find the number on the logarithmic scale that represents the multiplier and place it to the index $e$; also, the index $g$ to 1,000—that is, the commencement of the logarithmic scale. Then move the cylinder $b$ so that the laterally-projecting point $g'$ of the index $g$ points to the number on the scale that represents the multiplicand, and the quotient is either read off from the scale at the index $e$ or $d$. From the construction it will be seen that $e$ and $d$ can never both point to a number on the scale.

Example: To multiply 27 by 60, move the cylinder so that index $e$ will be at 60; then turn index $g$ so that its tip is at the beginning of the scale, or 10; then move the cylinder so that the number 27 is brought to the index $g$, and the result, 1,620, is indicated by the index $d$, as shown in Fig. 2.

*Division.*—Find the number on the logarithmic scale that represents the dividend, and place it to the index $d$; also, the laterally-projecting point of the index $g$ to the number that represents the divisor; then move the cylinder $b$ so that point $g'$ points to 1,000, and the quotient is either read off from the scale at the index $e$ or $d$.

Example: To divide 464 by 16, place the cylinder so that index $e$ points to 464; move index $g$ to 16; then move the cylinder so that the index $g$ rests at 10, and the quotient, 29, is read at index $e$.

Again: To divide 639 by 71, place the cylinder so that index $d$ points to 639; place index $g$ to 71; then move the cylinder so that the index $g$ points to 10, and the quotient, 9, is read at index $e$.

*Involution and Evolution.*—Find the number on the logarithmic scale that represents the number whose power or root is required and place it to index $e$; read the number of divisions on the scale $f$ above zero; also, the number of parts from the scale $h$. If the original number is in units, multiply or divide the sum of these two readings by the power or root, and adjust the cylinder so that the top line of the scale $h$ makes this reading on the scales $f$ and $h$. The index $d$ or $e$ will show the power or root required. If the number is in tens the whole number of the divisions of the scale $f$ is to be added to the observed readings before multiplying or dividing by the power or root. If the number is in hundreds, twice the number of divisions of the scale $f$ is to be added, if it is in thousands, three times the number, and so on. If after multiplying or dividing by the power or root the quotient is greater than the whole number of divisions on the scale $f$; then once, twice, three times, and so on, the whole number of divisions must be deducted from the quotient, and the remainder treated as shown above.

Example: To find the fifth root of 243, place the number 243 to the index $e$ and read scales $f$ and 2, which give 7.71; then add the number of divisions on scale $f$—that is, add 40—then divide this number 47.71 by the exponent 5, which gives 9.54; now, placing the cylinder so that scale $f$ reads 9, and scale 2 reads .54, the number 3 is found at the index $e$, and this is the required fifth root of 243.

It is not absolutely necessary that two indices should be fixed and one movable. The apparatus may be made with one fixed and two on the movable arm; but I prefer the method described in detail.

I claim—

1. The combination, with a rotary and longitudinally-movable cylinder mounted upon a suitable support and having a spiral logarithmic scale inscribed upon its surface, of fixed and movable indices adapted to be brought into coincidence with the several graduations of the logarithmic scale, substantially as and for the purpose set forth.

2. The combination of a rotary and longitudinally-movable cylinder having a spiral logarithmic scale inscribed upon its surface with one or more fixed indices and a movable pointer or index, substantially as described.

3. The combination, with a rotary and longitudinally-movable cylinder having a spiral logarithmic scale inscribed upon its surface, of a shaft passing through a central longitudinal aperture in said cylinder, a fixed pointer attached to said shaft and projecting over the surface of the cylinder, and a movable pointer attached to a rotary and longitudinally-movable support carried by said shaft, substantially as described.

4. The combination, with a rotary and longitudinally-movable cylinder having a spiral logarithmic scale inscribed upon its surface, of a shaft for supporting said cylinder, a rotary and longitudinally-movable collar arranged upon said shaft and provided with a pointer or index, and a fixed pointer attached to said shaft and arranged to project over the surface of the cylinder, substantially as described.

GEORGE FULLER.

Witnesses:
    W. J. C. ALLEN,
        *Ulster Bank, Belfast.*
    F. R. LEFFER,
        *Ulster Bank, Belfast.*